US005396230A

United States Patent [19]

Motegi

[11] Patent Number: 5,396,230

[45] Date of Patent: Mar. 7, 1995

[54] PAGER WITH OUT OF RANGE DETECTION BY TIMING LOSS OF SYNCHRONIZATION

[75] Inventor: Takamasa Motegi, Kawasaki, Japan

[73] Assignee: Matsushita Electric Industrial Co., Ltd., Osaka, Japan

[21] Appl. No.: 914,723

[22] Filed: Jul. 20, 1992

[30] Foreign Application Priority Data

Aug. 8, 1991 [JP] Japan ................................ 3-199388

[51] Int. Cl.[6] ................................ H04Q 7/00

[52] U.S. Cl. ................................ 340/825.44; 340/825.2; 340/825.36; 455/67.7

[58] Field of Search .............. 340/825.44, 539, 825.36, 340/825.20, 825.21; 455/58.2, 64, 67.7

[56] References Cited

U.S. PATENT DOCUMENTS

| | | | |
|---|---|---|---|
| 4,802,240 | 1/1989 | Yamaguchi et al. | 455/343 |
| 4,851,820 | 7/1989 | Fernandez | 340/825.44 |
| 4,860,004 | 8/1989 | Davis | 340/825.2 |
| 4,928,086 | 5/1990 | Drapac et al. | 340/825.44 |
| 5,032,835 | 7/1991 | DeLuca | 340/825.44 |
| 5,049,875 | 9/1991 | DeLuca et al. | 340/825.44 |
| 5,148,160 | 9/1992 | Kudoh | 340/825.44 |
| 5,193,216 | 3/1993 | Davis | 455/67.7 |
| 5,203,013 | 4/1993 | Breeden et al. | 455/67.7 |
| 5,283,550 | 2/1994 | Mac Intyre | 340/539 |

FOREIGN PATENT DOCUMENTS

| | | | |
|---|---|---|---|
| 0413963 | 2/1991 | European Pat. Off. | H04Q 7/02 |
| 226617 | 10/1990 | Japan . | |

*Primary Examiner*—Donald J. Yusko
*Assistant Examiner*—Edward Merz
*Attorney, Agent, or Firm*—Stevens, Davis, Miller & Mosher

[57] ABSTRACT

A selective calling receiver enabling a user to know exactly whether the receiver used by the user is placed within an area where a transmitted radio wave can be received well. The selective calling receiver collates a frame synchronization signal in the transmitted signal at predetermined intervals and as far as the collation is successful, the synchronization is kept and the receiver is operated in an intermittent reception mode. When the collation is not successful, an alarm is issued after a predetermined time to inform the user that the receiver has been placed outside of the area where the transmitted radio wave can be received well.

12 Claims, 3 Drawing Sheets

PAGER WITH OUT OF RANGE DETECTION BY TIMING LOSS OF SYNCHRONIZATION

BACKGROUND OF THE INVENTION

The present invention relates to an individually selective calling receiver for use in a mobile communication system or the like.

An individually selective calling receiver is carried by a person who is outdoors or away from his desk and receives a calling signal sent by means of an electric wave to respond to it. In such a receiver, different identification numbers are assigned to a plurality of receivers, respectively, and a transmitter sends the identification number assigned to a specific receiver to selectively call the receiver. Accordingly, in the individually selective calling receiver, reception sensitivity is most important and even when a user of the receiver is present in any area, it is desirable to be able to receive a call.

In the conventional individually selective calling receiver, however, an interval of transmission time is about five minutes with transmission for two minutes and a pause of transmission for three minutes repeated. However, there is a case where an electric wave is attenuated behind a building or within a building and a field intensity of the electric wave does not reach reception sensitivity. Thus, there is a problem that the user does not understand whether it is possible to receive a call in his place during a time domain for the pause of transmission.

A technique to solve the above problem is disclosed in Japanese Patent Unexamined Publication No. 2-266617. In this publication, the reception intensity of an electric wave sent from a base station is detected and when the reception intensity is smaller than a first threshold it is judged that the receiver is placed outside of an area where the electric wave can be received while when the reception intensity is larger than the first threshold but smaller than a second threshold it is judged that the receiver is placed within the area but can not receive the electric wave exactly with reliability.

In the above method, since judgment is made on the basis of the intensity of the received electric wave, the interference condition or the reception condition of the electric wave is different depending on circumstances of a building or the like even if the receiver is placed within the area and accordingly it is difficult to set the threshold.

SUMMARY OF THE INVENTION

The present invention is to solve the above problems in the prior art by providing an apparatus for selectively receiving a calling signal having the function of informing a user of an alarm when the field intensity of an electric wave is small or when the receiver is moved outside of an area where the electric wave can be received and capable of exactly informing the user that the receiver used by the user is moved outside of the area.

According to the present invention, a frame synchronization signal in a transmission signal is collated at predetermined intervals to keep synchronization and an alarm is generated after an elapse of a predetermined time when the collation of the frame synchronization signal has not been successful, so that conditions within and outside the area where the receiver can receive the electric wave can be judged relatively to exactly inform the user that the receiver is moved outside of the area.

DESCRIPTION OF THE PREFERRED EMBODIMENT

Figure 1:
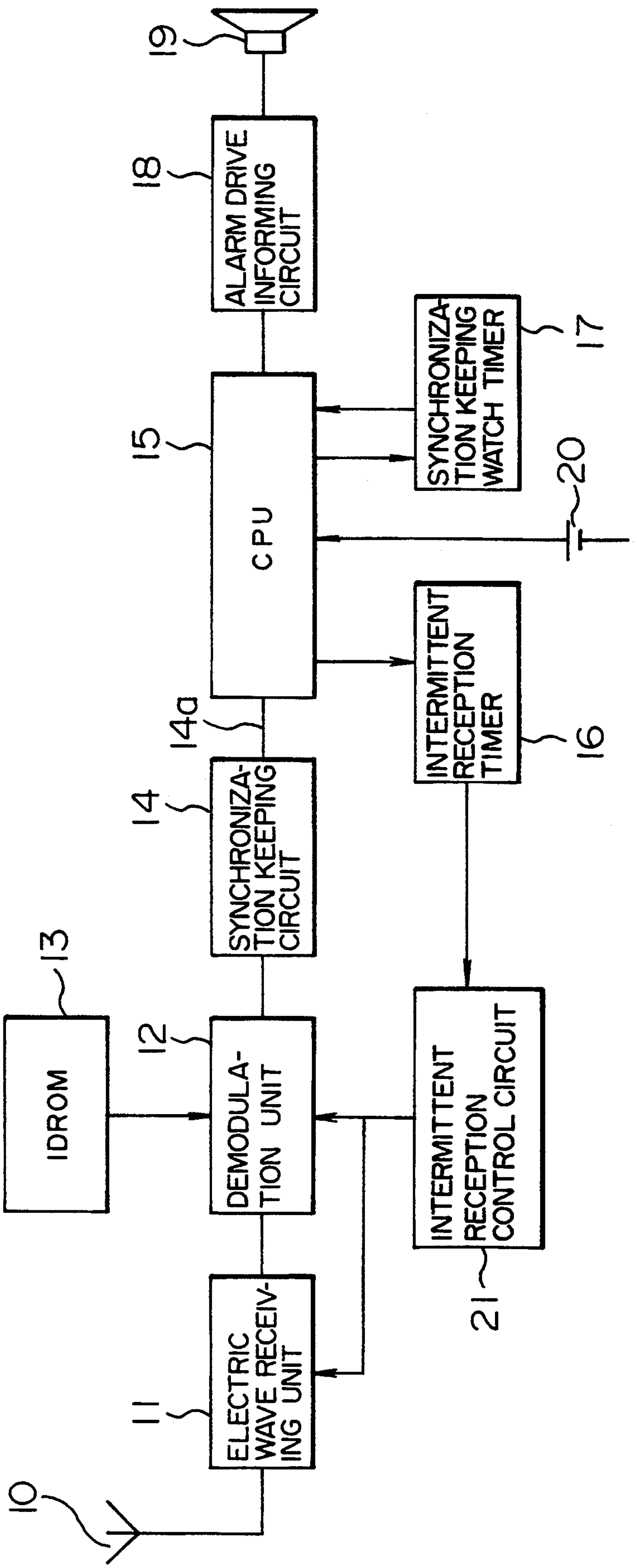
FIG. 1 is a block diagram schematically illustrating a selective calling receiver according to an embodiment of the present invention.

FIG. 1 is a block diagram schematically illustrating a selective calling receiver according to the present invention. In FIG. 1, numeral 11 denotes an electric wave receiving unit which receives an RF electric wave sent from a transmitting station through an antenna 10 and amplifies the received signal to supply it to a demodulation unit 12. The demodulation unit 12 demodulates the received signal and supplies the demodulated signal to a synchronization keeping (maintaining) circuit 14. Numeral 13 denotes an IDROM constituting read-only memory means in which an individual selective calling number for each receiver is stored and is supplied to the demodulation unit 12.

The synchronization keeping circuit 14 is supplied with an output of the demodulation unit 12 and performs synchronization collation or detection (hereinafter referred to as SC). The circuit 14 keeps a frame synchronization signal in a preamble. Numeral 15 denotes a control circuit (hereinafter referred to as a CPU). When the CPU 15 receives the frame synchronization signal 14*a* held in the synchronization keeping circuit 14, that is, a detection signal of the frame synchronization signal, the CPU is adapted to start an intermittent reception timer 16, and when synchronization keeping operation is released, the CPU is adapted to start a synchronization keeping (maintaining) watch timer 17. The synchronization keeping watch timer 17 and the intermittent reception timer 16 constitute a timer circuit.

Numeral 18 denotes an alarm drive informing (generating) circuit which is started by an output of the CPU 15 and drives a sound generator 19 such as a loud speaker. The alarm drive informing circuit 18 and the bound generator 19 constitute informing means.

Numeral 20 denotes a battery power supply which applies an operation voltage to the CPU 15. Numeral 21 denotes an intermittent reception control circuit which is supplied with an output of the intermittent reception timer 16 and controls the electric wave receiving unit 11 and the demodulation unit 12 to be in synchronous intermittent reception condition. The intermittent reception control circuit 21 always controls to save electric power of the battery.

Figure 3:
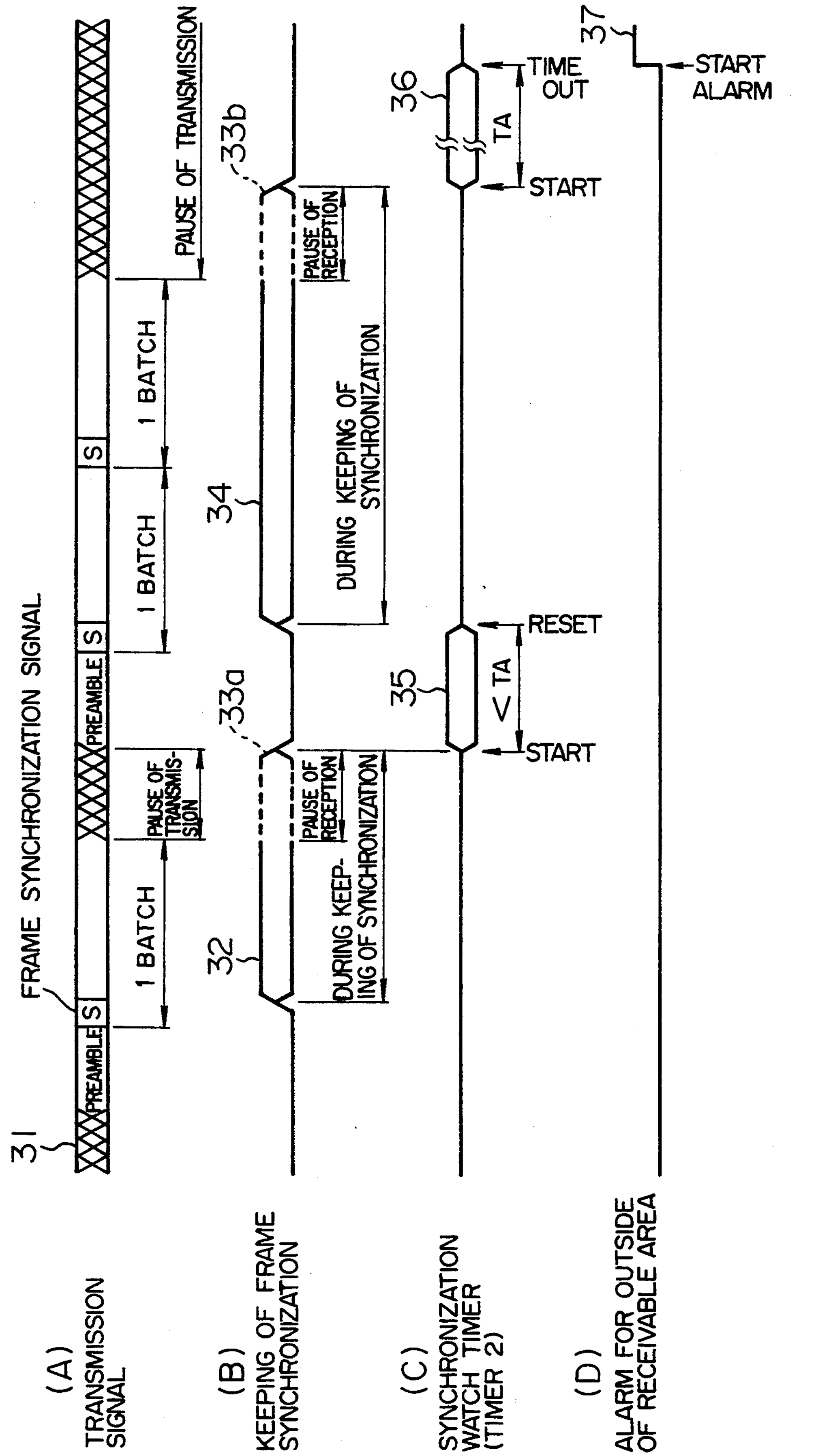
FIG. 3 is a timing chart for explaining operation of the selective calling receiver of FIG. 1.

Operation of the embodiment is now described with reference to the timing chart of FIG. 3. The electric wave received by the electric wave receiving unit 11 is demodulated and a reception signal is obtained in response to a transmission signal 31 shown in FIG. 3(A).

The collation and the keeping of SC are made in the synchronization keeping circuit 14. When the frame synchronization signal is detected subsequently to the preamble of the transmission signal 31, the synchronization keeping circuit 14 keeps the synchronization as shown by signal 32 in FIG. 3(B) until the transmission is cut off (FIG. 3(A)). The transmission signal 31 shown in FIG. 3(A) has a signal format conforming with the CCIR No. 1 system, for example.

The keeping of the frame synchronization signal is such that, in the operation in which a timing of the frame synchronization signals, inserted at regular intervals by the CCIR No. 1 system after the frame, synchronization collation is measured to make collation of the SC and it is confirmed that the frame synchronization signals are inserted at one Batch (equal to 1.0625 seconds) of a predetermined time sequence, the frame synchronization signal is collated only in the predetermined time sequence in a period of time that the frame synchronization signals are successfully confirmed n (n is a natural number, for example 2) times continuously in the predetermined time sequence. A period of time that the frame synchronization is kept, that is, a period of time that frame synchronization signals are detected in the predetermined time sequence means that a group of receivers to which the own receiver of interest belongs is called.

At the same time as the CPU 15 receives a detection signal of the frame synchronization signal 14*a*, the CPU 15 starts the intermittent reception timer 16 and sets the intermittent reception control circuit 21 to the synchronous intermittent reception condition to start the electric wave receiving unit 11 and the demodulation unit 12 to perform the synchronous intermittent reception operation.

In the synchronous intermittent reception operation, effected are the SC collation in the predetermined time sequence and the collation operation of the individual selective calling number in a predetermined time sequence subsequent to the frame synchronization signal named the own frame. More particularly, the individual selective calling number stored in the IDROM 13 is read out and supplied to the demodulation unit 12 to demodulate this individual selective calling number and the received data, and the demodulated individual selective calling number is collated in the CPU 15. Successful collation result represents that its user is called, and the alarm drive informing circuit 18 drives the sound generator 19 to produce a calling sound.

Even if the SC collation is not successful, the synchronization keeping operation is not released immediately and the synchronization keeping operation is continued by the synchronization recovery function as a signal 33*a* shown in FIG. 3(B) until the state that the SC collation is not successful is repeated two times or less. When the state that the SC collation is not successful is continued two times and the synchronization keeping operation by the signal 33*a* is released, the CPU 15 then starts the synchronization keeping watch timer 17 newly as shown by a signal 35 of FIG. 3(C) and starts a counting operation for a time (TA) for judging that the receiver is placed outside of the predetermined receivable area.

If the frame synchronization is acquired before the time TA expires, it is judged that the receiver is placed within the receivable area and the synchronization keeping watch timer 17 is reset as shown by signal 35 of FIG. 3(C) so that the intermittent reception control circuit 21 is set to the synchronization intermittent reception condition by means of the intermittent reception timer 16.

On the other hand, as shown by the operation subsequent to the signal 33*b* of FIG. 3(B), when the frame synchronization is not acquired until the synchronization keeping watch timer 17 reaches the time TA, the timer is timed out as shown by a signal 36 of FIG. 3(C) and it is judged that the receiver is placed outside of the receivable area. Thus, the alarm drive informing circuit 18 is started at the timing shown by a signal 37 of FIG. 3(D) to drive the sound generator 19 so that the alarm indicating that the receiver is placed outside of the receivable area is informed to the user. It is needless to say that the alarm sound generated at this time is different from the calling sound in modulation and rhythm.

Figure 2:
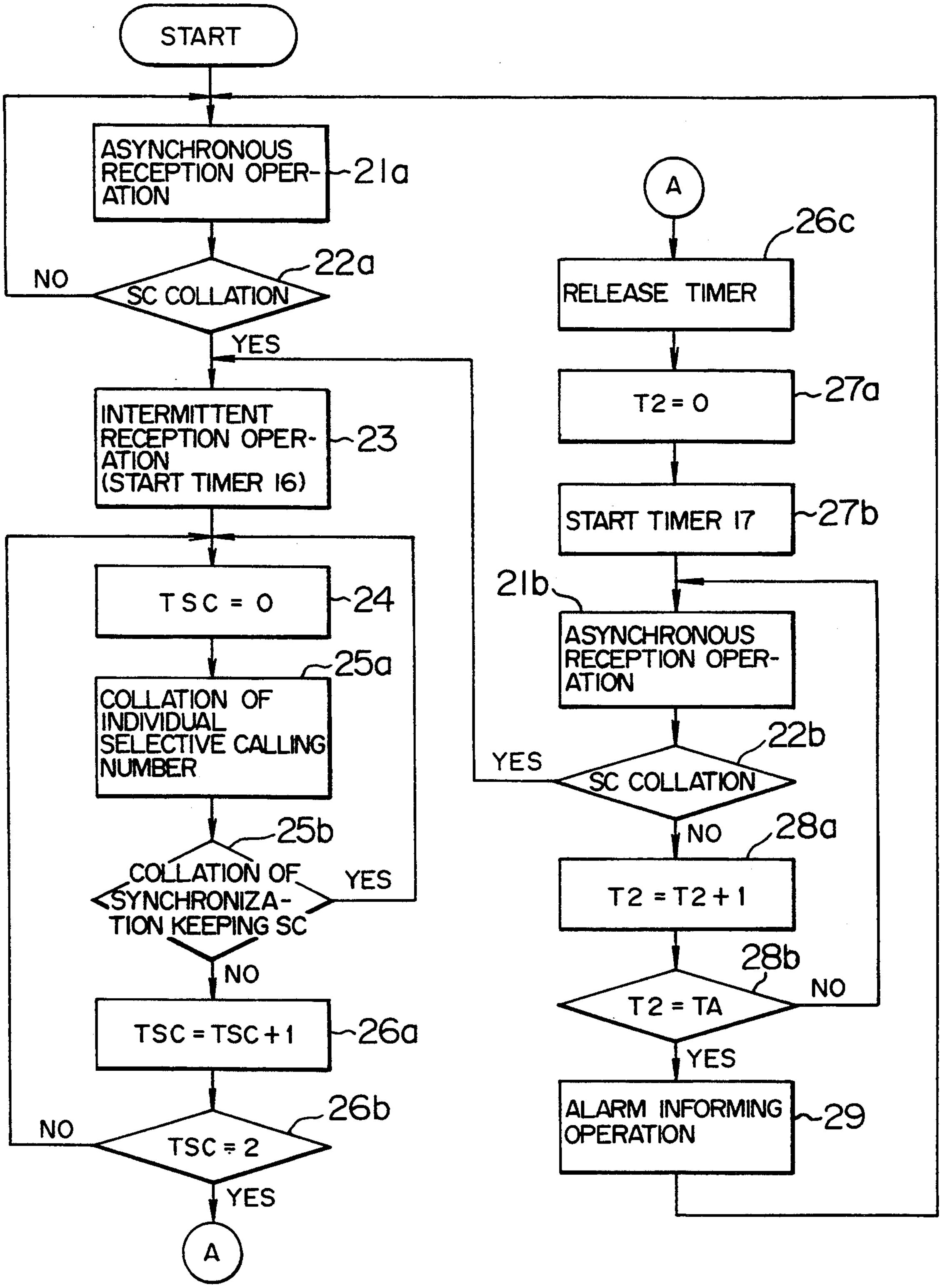
FIG. 2 is a flow chart showing operation of the selective calling receiver of FIG. 1.

FIG. 2 is a flow chart showing operation until the alarm is issued when the receiver is placed outside of the receivable area as described above. When the synchronization is acquired at steps 21*a* and 22*a*, the intermittent reception timer 16 is started at step 23 and an SC non-collation counter (hereinafter referred to as an SC counter) of the synchronization keeping watch timer 17 is reset (initialized) to zero at step 24.

When the intermittent reception operation is started by the intermittent reception timer 16, the SC collation in the predetermined time series at step 25*a* and the collation operation of the individual selective calling number in the predetermined time series subsequent to the own frame synchronization signal at step 25*a* are made.

While the synchronization keeping operation is continued (corresponding to the signals 32–34 of FIG. 3(B)), a count of the TS counter is less than 2 and the synchronous intermittent reception condition is maintained.

When the SC collation for keeping the synchronization at step 25*b* is not successful (out of synchronization), the process proceeds to step 26*a* and an out-of-synchronization counter TSC 1 is incremented by one.

Further, at step 26*b*, if the out-of-synchronization condition is continued until the TSC is equal to two in the process of step 26*a*, the intermittent reception timer 16 is released and the synchronization keeping operation is released at step 26*c*. When the synchronization is collated again, the process is returned from step 26*b* to step 24 to reset the counter TSC to 0.

When the intermittent reception timer 16 is released, the synchronization keeping watch timer 17 is initialized (T2=0) at step 27*a* and is then started at step 27*b*, so that the asynchronous reception operation is started at step 21*b*. The frame synchronization acquiring operation is continued at step 21*b* until the predetermined value (time TA) is exceeded or until the synchronization is acquired again in the asynchronous reception operation. The synchronization acquiring operation adds one to the contents T2 of a counter of the synchronization keeping watch timer 17 if there is no SC at step 22*b*, and whether the contents reaches the predetermined value TA or not is judged at step 28*b*. When the contents does not reach the predetermined value TA, the process is returned to step 21*b* and the synchronization acquiring operation is made again. Then, the SC collation is made at step 22*b* and the same operation is repeated. Thus, if the synchronization is acquired again at step 21*b* before the count of T2 reaches the time TA, the process is returned to step 23 in accordance with judgment at step 22*b* and the receiver enter to the normal intermittent reception state.

On the other hand, at step 28*b*, when the count T2 of the synchronization keeping watch timer 17 reaches or exceeds the time TA, the alarm informing function is started at step 29 and the user is informed that the receiver is placed outside of the reception area. Then, the process is returned to step 21*a* and the asynchronous reception operation which is the synchronization acquiring operation is kept.

As described above, according to the embodiment, when the frame synchronization signal received by the electric wave receiving unit 11 is collated at predetermined intervals to keep synchronization, the intermittent reception timer 16 is started by the CPU 15 to set the intermittent reception control circuit 21 to the synchronous intermittent reception condition and the electric wave receiving unit 11 and the demodulation unit 12 are operated. Then, data from the IDROM 13 is supplied to the demodulation unit 12 and collation of the individually selective calling number is made in the CPU 15. When the collation of the frame synchronization signal is not successful, the alarm drive informing circuit 18 is driven by an output of the synchronization keeping watch timer 17 after elapse of the predetermined time so that the sound generator 19 is operated. Accordingly, when the field intensity is lowered or the receiver is moved outside of the receivable area, the alarm can be informed and the user can understand the current position. Thus, even if the collation of the frame synchronization is not successful, the synchronization is kept by the synchronization recovery function within a fixed time. Further, when the state that the synchronization is not collated is continued, it is judged that the receiver is placed outside of the receivable area after the predetermined counting operation by the timer circuit and the informing means is started to inform the alarm. Accordingly, when the field intensity is small or the receiver is moved outside of the receivable area, the alarm is issued to inform it and the position of the user can be detected by collation of the synchronization signal instead of the individually selective signal.

What is claimed is:

1. A selective calling receiver comprising:

an electric wave receiving unit for receiving an identification number sent from a transmitter, said identification number being peculiar to said receiver;

memory means for storing the identification number peculiar to said receiver;

a demodulation unit for demodulating an output of said electric wave receiving unit;

a synchronization maintaining circuit for collating a frame synchronization signal from an output signal of said demodulation unit at predetermined intervals to maintain synchronization;

a first timer circuit started by said synchronization maintaining circuit;

an intermittent reception control circuit for operating said electric wave receiving unit and said demodulation unit intermittently and introducing said peculiar identification number stored in said memory means into said demodulation unit;

a second timer circuit started when (i) collation of the frame synchronization signal is not successful and (ii) synchronization maintained by said synchronization maintaining circuit is released after starting of said first timer circuit, said second timer circuit timing out a predetermined time; and a control circuit for starting informing means by an output signal of said second timer circuit after said predetermined time.

2. A selective calling receiver according to claim 1, wherein said control circuit stops operation of said second timer circuit when synchronization of the frame synchronization signal is re-acquired within said predetermined time, after said second timer circuit has been started.

3. A selective calling receiver comprising:

means for receiving a transmission signal and examining the presence of an identification number peculiar to said receiver;

synchronization maintaining means for collating a frame synchronization signal included in said transmission signal and maintaining synchronization;

means for continuing reception operation while said synchronization maintaining means maintains synchronization; and means for informing an alarm after a predetermined time during which collation of the frame synchronization signal by said synchronization maintaining means is not successful, said predetermined time being measured after initial synchronization by said synchronization maintaining means.

4. A selective calling receiver according to claim 3, comprising means for stopping measurement of said predetermined time when synchronization of the frame synchronization signal is re-acquired within said predetermined time.

5. A selective calling receiver according to claim 3, comprising first timer means for starting counting when said synchronization maintaining means starts to maintain synchronization; and second timer means for starting counting when collation of the frame synchronization signal is not successful after said first timer means has been started, wherein when said first timer means starts counting, reception operation is started and when said second timer means has counted a predetermined time, the alarm is informed.

6. A selective calling receiving device which receives a radio wave signal containing a synchronization signal coded with a receiver identification code and collates the received identification code with an individual identification code of said receiving device, said selective calling device comprising:

means for receiving a transmitted radio wave signal;

means for demodulating the received signal;

memory means for storing the individual identification code of said receiving device;

a synchronization maintaining circuit for collating a demodulated synchronization signal, obtained by said demodulation means, at predetermined intervals to maintain synchronization of said receiving device with said transmitted radio wave signal;

an intermittent reception control circuit for enabling said radio wave receiving means and said demodulating means intermittently to introduce therein a signal of said individual identification code stored in said memory means;

a first timer circuit, operatively associated with said synchronization maintaining circuit, for timing out a first predetermined time period in response to said collation of said demodulated synchronization signal by said synchronization maintaining circuit;

a second timer circuit, operatively associated with said synchronization maintaining circuit, for timing out a second predetermined time period and generating an output in response thereto, said second timer circuit beginning said timing when (i) said synchronization maintaining circuit is not successful in collating said demodulation synchronization signal and (ii) said synchronization maintained by said synchronization maintaining circuit is released after the starting of said first timer circuit; and an alarm control circuit for generating an alarm in response to an output of said second timer circuit output after said second predetermined time period.

7. A selective calling receiver comprising:

means for receiving a transmission signal and collating said transmission signal if an identification code signal of said receiver is included in the received transmission signal;

synchronization maintaining means for collating, at predetermined intervals, a frame synchronization signal included in said transmission signal and maintaining synchronization of said receiver with said transmission signal;

means for maintaining operation of the receiving means while said synchronization maintaining means maintains said synchronization; and means for generating an alarm after a predetermined time period during which said synchronization maintaining means has failed to maintain said synchronization.

8. A selective calling receiver according to claim 7, further comprising means for stopping measurement of said predetermined time period when synchronization of the frame synchronization signal with said receiver is re-acquired within said predetermined time period.

9. A selective calling receiver according to claim 7, further comprising first timer means for starting timing operation when said synchronization maintaining means has maintained said synchronization; second timer means for starting a timing operation when said synchronization maintaining means fails to collate the frame synchronization signal for said predetermined time period after said first timer means has been started; means for enabling the receiving means to receive a transmission signal when said first timer starts said timing operation; and means for generating said alarm when said second timer means has timed out said predetermined time period.

10. A selective calling receiver for receiving and decoding an incoming electric wave signal, externally transmitted, with at least a frame synchronization signal and a code signal of an identification number assigned for identifying said receiver, said receiver comprising:

(a) memory means for prestoring data of the identification number of said receiver;

(b) means for receiving an incoming transmitted electric wave signal and outputting a corresponding electric signal;

(c) demodulation means for demodulating the corresponding electric signal output from said receiving means;

(d) synchronization maintaining means for collating a frame synchronization signal of the demodulated output signal periodically at predetermined intervals and generating (i) a signal of collation success when said collation is successful and (ii) a signal of collation failure when said collation is unsuccessful, said synchronization maintaining means also maintaining synchronization with the collated synchronization signal in response to successful collation;

(e) means for informing of a failure of the collating operation;

(f) first timer counter means;

(g) second timer counter means;

(h) control means, responsive to the signals generated by said synchronization maintaining means, for controlling said first and second timer counter means, said control means comprising:

(1) means for detecting said signal of collation success and controlling said first timer counter means to start a timing operation in response to said signal of collation success, (2) means for detecting each signal of collation failure from said synchronization maintaining means and counting each such detection to obtain a first count, (3) means for detecting said signal of collation success from said synchronization maintaining means after the starting operation of said first counter means and resetting said first timer counter means in response thereto, (4) means for comparing said first count representing a number of the detected signals of collation failures with a first given threshold count value and starting said second time counter means when said count is greater than said first given threshold count value, (5) means for detecting each signal of collation failure from said synchronization maintaining after said second timer counter means begins operation, and counting each such detection to obtain a second count, (6) means for comparing said second count with a second given threshold count value and enabling informing means for generating an alarm when said second count exceeds said second given threshold count value, (7) means for resetting said first timer counter means in response to at least one of (i) said second count exceeding said second given threshold count value and (ii) detection of a signal of collation success from said synchronization keeping circuit; and (i) intermittent reception control means for intermittently enabling said electric wave receiving means and said demodulation means and introducing the data of identification number stored in said memory means into said demodulation means in response to the starting of operation of said first timer counter means.

11. A selective calling receiver for receiving and decoding an incoming electric wave signal transmitted from an external transmitter and coded with a synchronization signal and an identification code assigned for identifying said receiver, said receiver comprising:

means for receiving and demodulating a transmitted incoming electric wave signal and determining if the identification code is included in the received signal;

means for collating, at predetermined intervals, a frame synchronization signal, if present, in the demodulated signal in order to generate a signal of collation success in response to successful collation and a signal of collation failure in response to unsuccessful collation for each attempted collation of the synchronization signal, and for maintaining synchronization with said signal of collation success;

means for continuing signal receiving operation while the synchronization is maintained;

means for identifying change of the output of said means for collating from (i) the signal of collation success to (ii) the signal of collation failure, said identifying means including means for detecting said signal of collation success generated by the collating means, and timer means for detecting a predetermined number of signals of collation failure generated in time sequence by said collating means during a predetermined time period after the detection of the collation success signal; and means for generating an alarm in response to the detection of said predetermined number of signals of collation failure.

12. A selective calling receiver according to claim 11, wherein said identifying means comprises:

first timer counter means, second timer counter means, and control means, responsive to the signals generated by said collating means, for controlling said first and second timer counter means, said control means including means for detecting said signal of collation success and starting operation of said first timer counter means in response thereto and for detecting each signal of collation failure output from said collating means and counting each such detection to obtain a first count, means for detecting a signal of collation success from said collating means after the starting of operation of said first counter means and resetting said first timer counter means in response thereto, means for determining whether said first count representing a number of the detected signals of collation failures exceeds a first given threshold count value and starting said second timer counter means in response thereto, and means for detecting each signal of collation failure from said collating means and counting each such detection to obtain a second count, and means for determining whether said second count exceeds a second given threshold count value and enabling the alarm generating means in response thereto.

* * * * *